(12) United States Patent
Macleod et al.

(10) Patent No.: US 8,573,006 B2
(45) Date of Patent: Nov. 5, 2013

(54) BATCH CHARGER COOLING (75) Inventors: Kenneth D. Macleod, Rossford, OH (US); David L. Lewis, Sylvania, OH (US); Robert Ponzi, Temperance, MI (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 71 days.

(21) Appl. No.: 13/346,389

(22) Filed: Jan. 9, 2012

(65) Prior Publication Data
US 2013/0174611 A1 Jul. 11, 2013

(51) Int. Cl.
*C03B 3/00* (2006.01)
*C03B 5/16* (2006.01)

(52) U.S. Cl.
USPC .............. 65/335; 65/136.2; 65/356; 414/165; 414/166

(58) Field of Classification Search
USPC ........... 414/165–166; 65/135.9, 136.1, 136.2, 65/335, 347
See application file for complete search history.

(56) References Cited

U.S. PATENT DOCUMENTS

| 296,227 | A | | 4/1884 | Schulze-Berge | |
|---|---|---|---|---|---|
| 1,822,705 | A | | 9/1931 | Mambourg | |
| 2,834,157 | A | | 5/1958 | Bowes | |
| 3,167,191 | A | * | 1/1965 | Zellers, Jr. | 414/166 |
| 3,249,417 | A | | 5/1966 | Van Zonneveld | |
| 3,459,413 | A | | 8/1969 | Bracken et al. | |
| 3,868,031 | A | * | 2/1975 | Frazier et al. | 414/804 |
| 4,197,109 | A | * | 4/1980 | Frazier et al. | 65/335 |
| 4,226,564 | A | * | 10/1980 | Takahashi et al. | 414/166 |
| 4,290,797 | A | * | 9/1981 | Rossi | 65/335 |
| 4,349,376 | A | | 9/1982 | Dunn et al. | |
| 4,854,959 | A | * | 8/1989 | Waltert | 65/335 |
| 5,073,183 | A | * | 12/1991 | Hammond et al. | 65/335 |
| 5,238,347 | A | * | 8/1993 | James | 414/165 |

FOREIGN PATENT DOCUMENTS

CN 201250167 Y 6/2009
GB 1 425 461 2/1976

OTHER PUBLICATIONS

International Search Report and Written Opinion for International Application No. PCT/US2013/020484, International Filing Date—Jul. 1, 2013, Mailing Date—Sep. 1, 2012, 7 pages.
Sims, Richard, Sorg—Batch Charging Technologies—A Review, Nikolaus Sorg GmbH & Co. KG, 2007, 8 pages.
GTech Glass Technologies, Electronic Oscillating Batch Charger, BDF Industries, 2 pages.
GTech Glass Technologies, Oscillating Batch Charger—Standard, BDF Industries, 2 pages.

* cited by examiner

*Primary Examiner* — Jason L Lazorcik (57) ABSTRACT

A coolant box for a glass batch charger that includes a base, a front wall, a rear wall, a coolant labyrinth extending from the base between the front and rear walls, and including a plurality of curvate baffle walls establishing a plurality of curvate coolant channels.

3 Claims, 8 Drawing Sheets

BATCH CHARGER COOLING

The present disclosure is directed to batch chargers for glass melting furnaces and, more particularly, to cooling of batch chargers.

BACKGROUND AND SUMMARY OF THE DISCLOSURE

A general object, in accordance with one aspect of the disclosure, is to provide water boxes for batch chargers that have curvate flow paths for improved coolant flow in the boxes. Improved coolant flow results in improved cooling of the boxes to avoid hotspots and corrosion at the hotspots, thereby extending the lifespan of the boxes to reduce downtime of glass manufacturing operations.

The present disclosure embodies a number of aspects that can be implemented separately from or in combination with each other.

A coolant box for a glass batch charger in accordance with one aspect of the disclosure includes a base, a front wall, a rear wall, a coolant labyrinth extending from the base between the front and rear walls, and including a plurality of curvate baffle walls establishing a plurality of curvate coolant channels.

In accordance with another aspect of the disclosure, there is provided a glass batch charger for charging batch glass-forming materials into a melt furnace. The charger includes a stationary box of hollow arcuate construction having a part-circular opening and coolant circulation paths extending throughout the hollow arcuate construction, and an oscillating box of hollow part-circular construction disposed within the part-circular opening of the stationary box, the oscillating box having coolant circulation paths extending throughout the hollow part-circular construction. The charger also includes a pusher box on the oscillating box for coupling to an actuator to push glass batch materials from a hopper past the stationary and oscillating boxes into a melt furnace, and means for circulating coolant at least through the stationary and oscillating boxes. The coolant circulation paths in the stationary box are arcuate around the part-circular opening, and the coolant circulation paths in the oscillating box are arcuate around an axis of the part-circular construction.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

Figure 1:
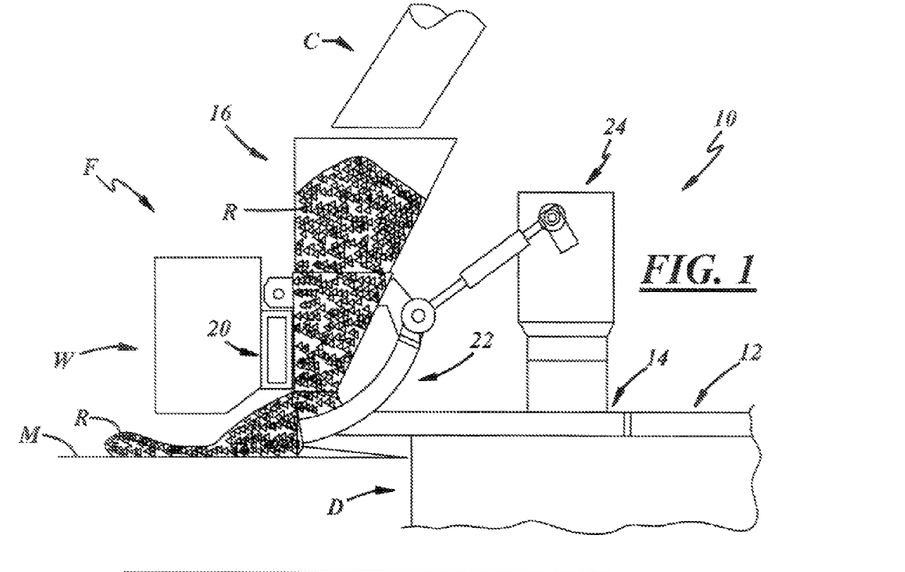
FIG. 1 is a fragmentary, schematic, side view a portion of a glass melting furnace, a feed chute for delivering glass batch materials, and a batch charger for introducing the glass batch materials into the furnace in accordance with an illustrative embodiment of the present disclosure.
Figure 2:
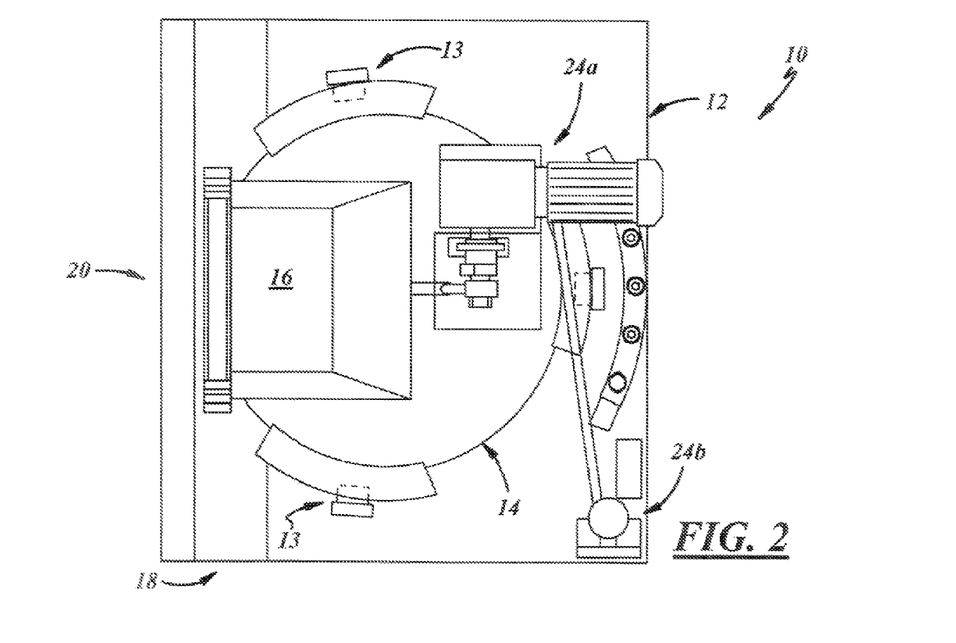
FIG. 2 is a top view of the batch charger of FIG. 1.

FIG. 1 illustrates a glass furnace F that may include an exterior wall W, a doghouse D to introduce raw materials into the furnace F, a raw material or batch chute C, and a raw material or batch charger 10 that may be carried by the doghouse D to charge glass batch materials R into the furnace F onto a glass melt M. Referring also to FIG. 2, the batch charger 10 may include one or more coolant boxes. One or more of the boxes may be of hollow construction.

For example, the charger 10 may include a stationary or base box 12 that may be of hollow arcuate construction and may be used to support other portions of the batch charger 10, and an oscillating box 14 that may be of hollow part-circular construction and rotatably supported by the base box 12 (for example, by any suitable bearings 13, shown in FIG. 2) and may be used to support other portions of the batch charger 10. The batch charger 10 also may include a raw material or batch hopper 16 that may be carried by the oscillating box 14 and receives the materials R from the chute C for delivery to the furnace F, a horizontal riser box 18 (FIG. 2) that may be carried by the base box 12, and a vertical box 20 that may be carried by the horizontal box 18 (FIG. 2). The batch charger 10 further may include a pusher box 22 (FIG. 1) that may be movably supported by a pusher actuation system 24a, which may be carried by the oscillating box 14. Similarly, the batch charger 10 also may include an oscillation actuation system 24b that may be used to oscillate the oscillation box 14 back and forth. The pusher and oscillation actuation systems 24a, 24b may include supports, motors, cranks, levers, and/or any other suitable subsystems and components, for example, to oscillate the oscillation box 14 and advance and retract the pusher box 22 (FIG. 1). Such systems are well known in the art and are not the subject of the present disclosure. Accordingly, oscillating box 14 may be oscillated and the pusher box 22 (FIG. 1) may be advanced and retracted to push and spread the glass batch materials R from the hopper 16 onto the glass melt M in the furnace F.

Figure 3:
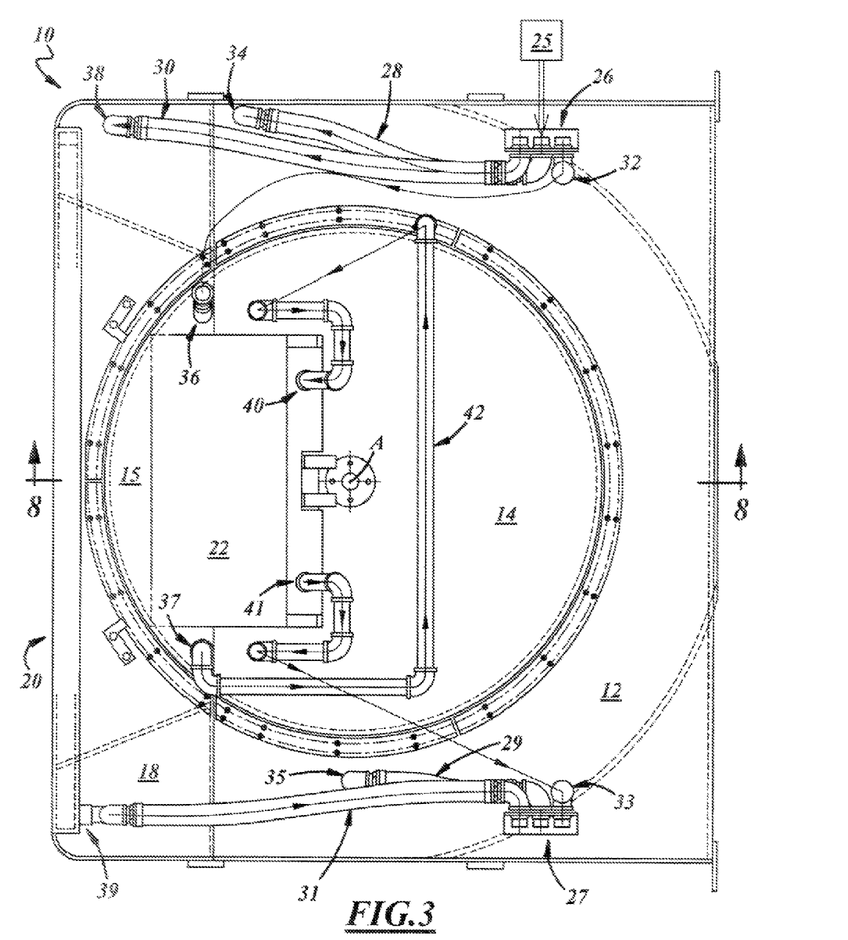
FIG. 3 is an enlarged top view of a portion of the batch charger of FIG. 1.

FIG. 3 illustrates the boxes 12, 14, 18, 20, 22 and related external conduit and connectors in fluid communication therebetween. (Some conduit is omitted for the sake of clarity)

For example, an inlet manifold 26 may be in fluid communication with a base inlet conduit 28, a riser inlet conduit 30, and an oscillator inlet conduit 32. Similarly, an outlet manifold 27 may be in fluid communication with a base outlet conduit 29, a riser outlet conduit 31, and a pusher outlet conduit 33. Also, the batch charger 10 may include a means for circulating coolant at least through the stationary and oscillating boxes 12, 14. For example, a coolant circulating means 25 may include any suitable pumps, filters, conditioners, municipal water supply, or the like.

The base box 12 may include an inlet 34 in fluid communication with the base inlet conduit 28, and an outlet 35 in fluid communication with the base outlet conduit 29. The oscillating box 14 may include an inlet 36 in fluid communication with the oscillator inlet conduit 32, and also may include an outlet 37. The riser boxes 18, 20 include an inlet 38 in fluid communication with the riser inlet conduit 30 and an outlet 39 in fluid communication with the riser outlet conduit 31. The pusher box 22 may include an inlet 40 in fluid communication with an external oscillator conduit 42, and an outlet 41 in fluid communication with the pusher outlet conduit 33.

Figure 4:
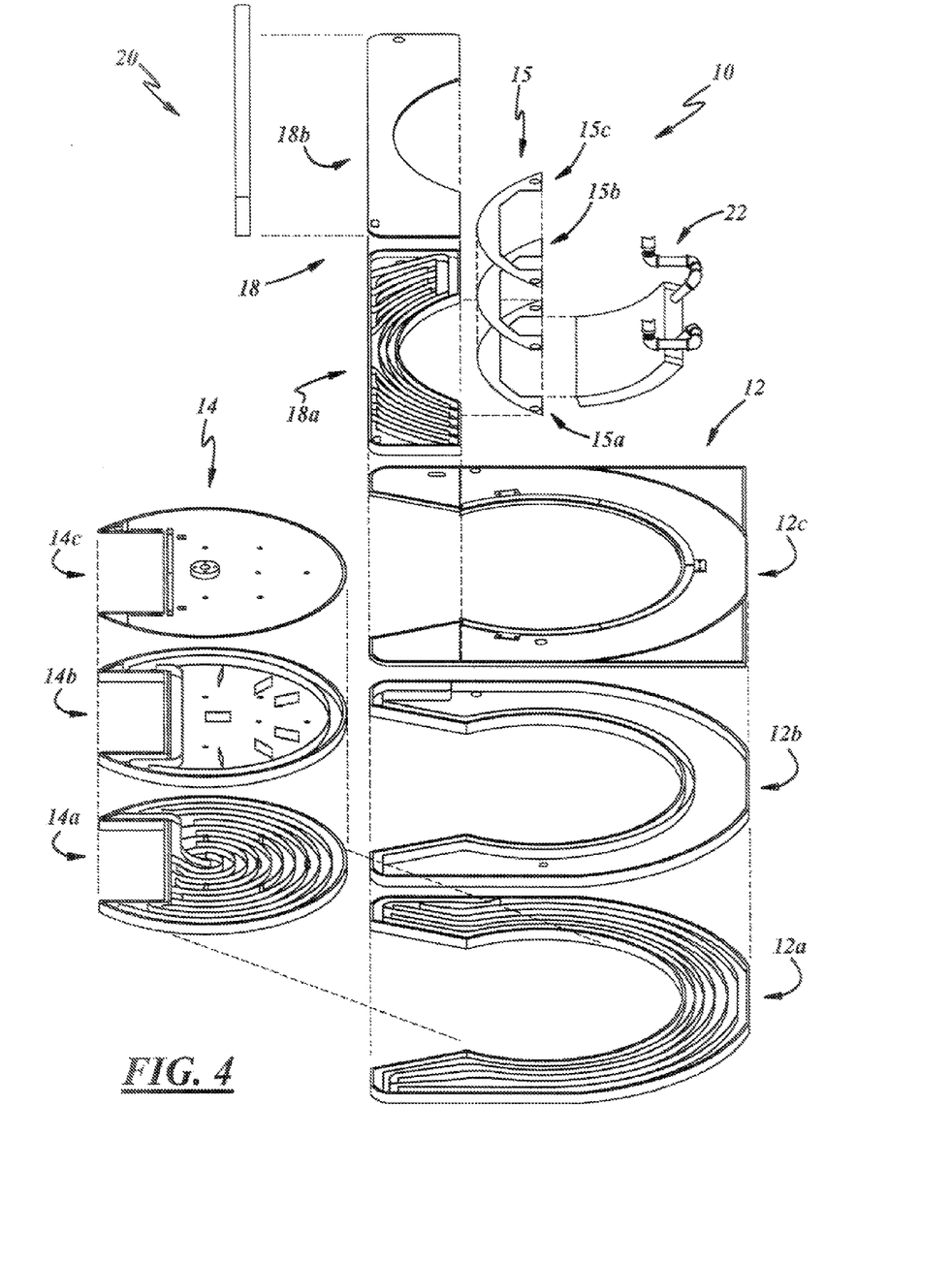
FIG. 4 is an exploded perspective view of the portion of the batch charger of FIG. 1.

FIG. 4 illustrates an exploded perspective view of the coolant boxes. The base box 12 may include a plurality of levels, which may include a lower level 12a and an upper level 12b, and a cover 12c. Similarly, the oscillating box 14 may include a plurality of levels, which may include a lower level 14a and an upper level 14b, and a cover 14c. The oscillating box 14 also may include a trim portion or bezel 15 including a plurality of levels, which may include a lower level 15a, an upper level 15b, and a cover level 15c. Likewise, the horizontal riser box 18 may include a lower level 18a and a cover 18b. In other embodiments, one or more of the base or oscillating boxes 12, 14 may omit the upper levels. The levels of the respective boxes may be coupled to one another in any suitable manner. For example, the levels may be fastened, pressed, staked, welded, or the like to one another. Although not shown, any suitable seals may be used between the various levels.

Figure 5:
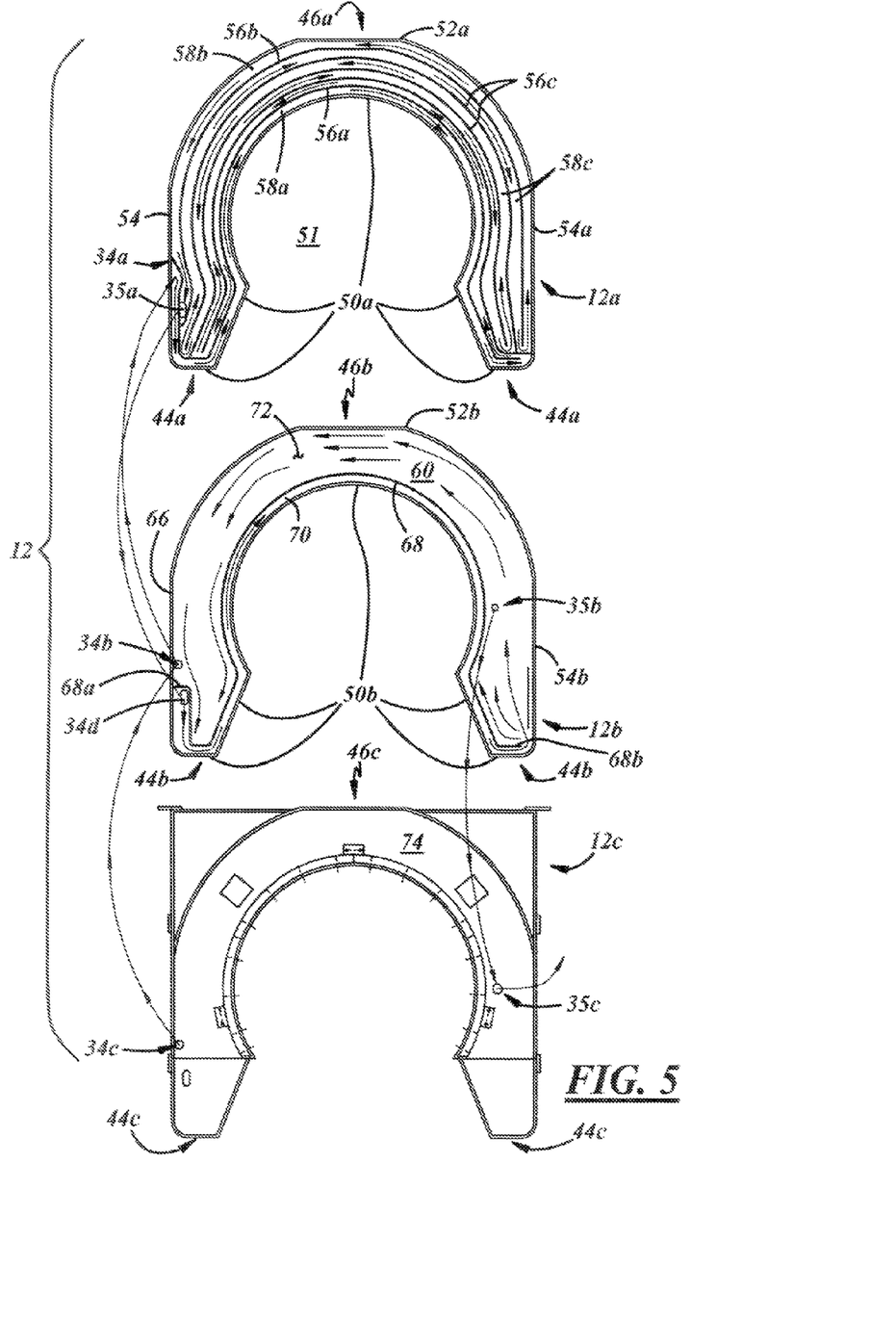
FIG. 5 is an exploded top view of a base portion of the batch charger of FIG. 1.
Figure 8:
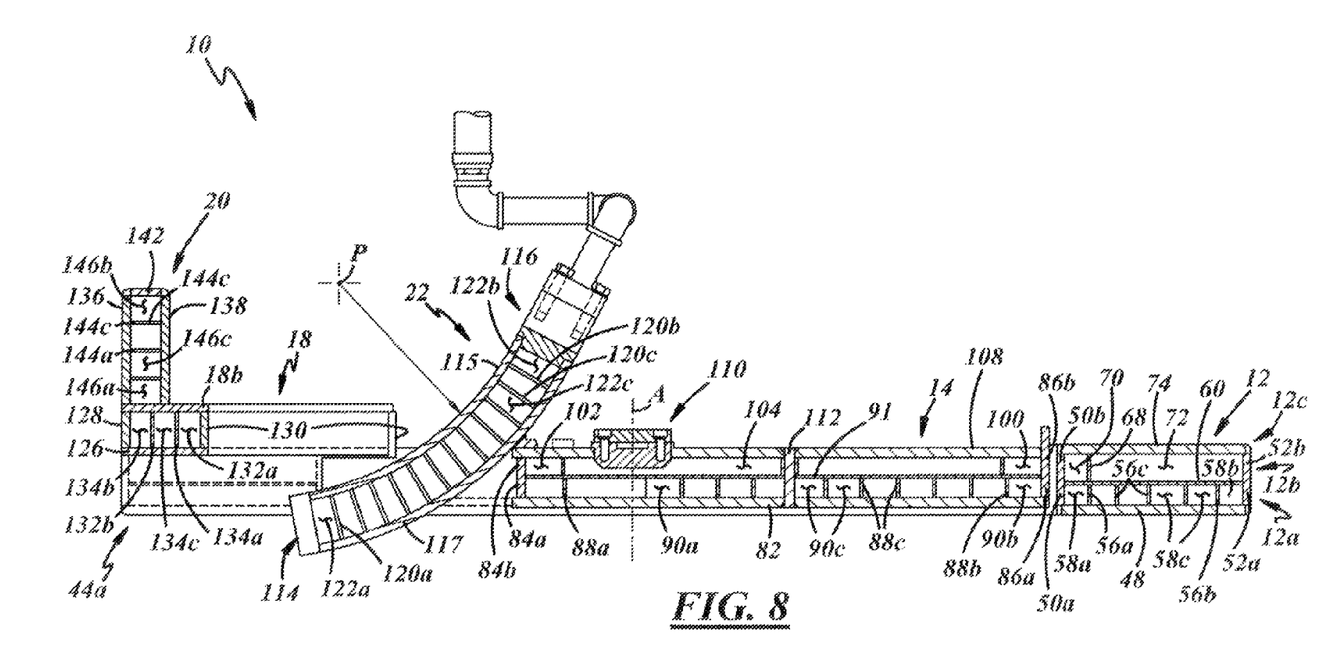
FIG. 8 is a sectional view of the portion of the batch charger illustrated in FIG. 3, taken along line 8-8.

Referring now to FIGS. 5 and 8, the base box 12 may be substantially horseshoe-shaped and may include heel portions 44a-c and a toe portion 46a-c between the heel portions 44a-c. As used herein, the phrase "substantially horseshoe-shaped" includes shapes that are not exactly or entirely shaped as a horseshoe throughout, but have a recognizable horseshoe-shaped profile. The base box 12 may include, for example in the lower level 12a, a base 48 (FIG. 8), a front wall 50a (FIG. 5), a rear wall 52a, and side walls 54a (FIG. 5) between the front and rear walls 50a, 52a. A large portion of the front wall 50a may be circular and may establish an opening 51 to accommodate the rotatable oscillating box (not shown). Likewise, a portion of the rear wall 52a may be circular.

The base box 12 also may include, for example in the lower level 12a, a coolant labyrinth extending from the base 48 between the walls 50a, 52a, 54a and including a plurality of curvate baffle walls 56a-c that establish a plurality of curvate coolant channels 58a-c. As used herein, the term "curvate" includes substantially curved or arcuate lines as distinct from substantially straight lines that may have bent ends. The baffle walls 56a-c may be shaped to follow the contour of the respective walls 50a, 52a, 54a. For example, the coolant channels 58a-c may be arcuate or curvate around the opening 51. Accordingly, the baffle walls 56a-c and coolant channels 58a-c may be substantially circular. As used herein, the phrase "substantially circular" includes shapes that are not exactly or entirely circular throughout their entire length but have a recognizable circular-shaped profile.

The baffle walls 56a-c and coolant channels 58a-c may include a radially inner-most baffle wall 56a and coolant channel 58a, a radially outer-most baffle wall 56b and coolant channel 58b, and one or more intermediate baffle walls 56c and coolant channels 58c therebetween.

Accordingly, the base box 12 may include at least two curvate coolant channels 58a-c that may extend from heel portion 44a to heel portion 44a across the toe portion 46a. The baffle walls 56a-c and coolant channels 58a-c may be incurvate, for example, about an oscillation axis A of the oscillating box 14 (FIG. 8). In a more specific example, the baffle walls and coolant channels 56a-c, 58a-c may be concentric about the axis A. As used herein, the term "concentric" includes walls and/or channels having a common center, but regardless of the shape of the walls and/or channels, such that the walls and/or channels may be curvate but need not be circles or circular.

Also, the coolant labyrinth may include an inlet 34a and an outlet 35a, wherein the inlet 34a may be upstream of the radially inner-most coolant channel 58a, and the outlet 35a may be downstream of the radially outer-most coolant channel 58b. The inlet 34a and the outlet 35a both may be provided in one of the heel portions 44a.

In an embodiment where the base box 12 includes the upper level 12b, the upper level 12b may include an intermediate plate 60, a front wall 50b, a rear wall 52b, side walls 54b between the front and rear walls 50b, 52b, and a baffle wall 68 extending from the plate 60 between the walls 50b, 52b, 54b, which may correspond to the walls 50a, 52a, 54a of the lower level 12a. The walls 50a-b, 52a-b, and 54a-b may be separate walls or may be integrated respectively with one another as illustrated in FIG. 8. The baffle wall 68 may be disposed adjacent to and may be shaped to follow the contour of the front wall 62 to establish a coolant passage 70, and may include a fixed or closed end 68a in one heel portion 44b and a free or open end 68b in the other heel portion 44b.

The upper level 12b, shown in FIG. 5, also may include a coolant pool 72 disposed between the baffle wall 68 and the rear and side walls 64, 66. Accordingly, the baffle wall 68, coolant channel 70, and pool 72 may be substantially circular. Also, the upper level 12b may include a passage 34b that may be aligned with the inlet 34a of the lower level 12a, an inlet 34d that may be aligned with the outlet 35a of the lower level 12a, and an outlet 35b. The inlet 34d may be adjacent the closed end 68a of the baffle 68 in the coolant channel 70, and the outlet 35b may be in the coolant pool 72 downstream of the open end 68b of the baffle 68. The cover 12c may include a cover plate 74, and walls corresponding to the walls of the upper level 12b. Also, the cover 12c may include an inlet 34c that may be aligned with the passage 34b of the upper level 12b, and an outlet 35c that may be aligned with the outlet 35b of the upper level 12b.

Figure 6:
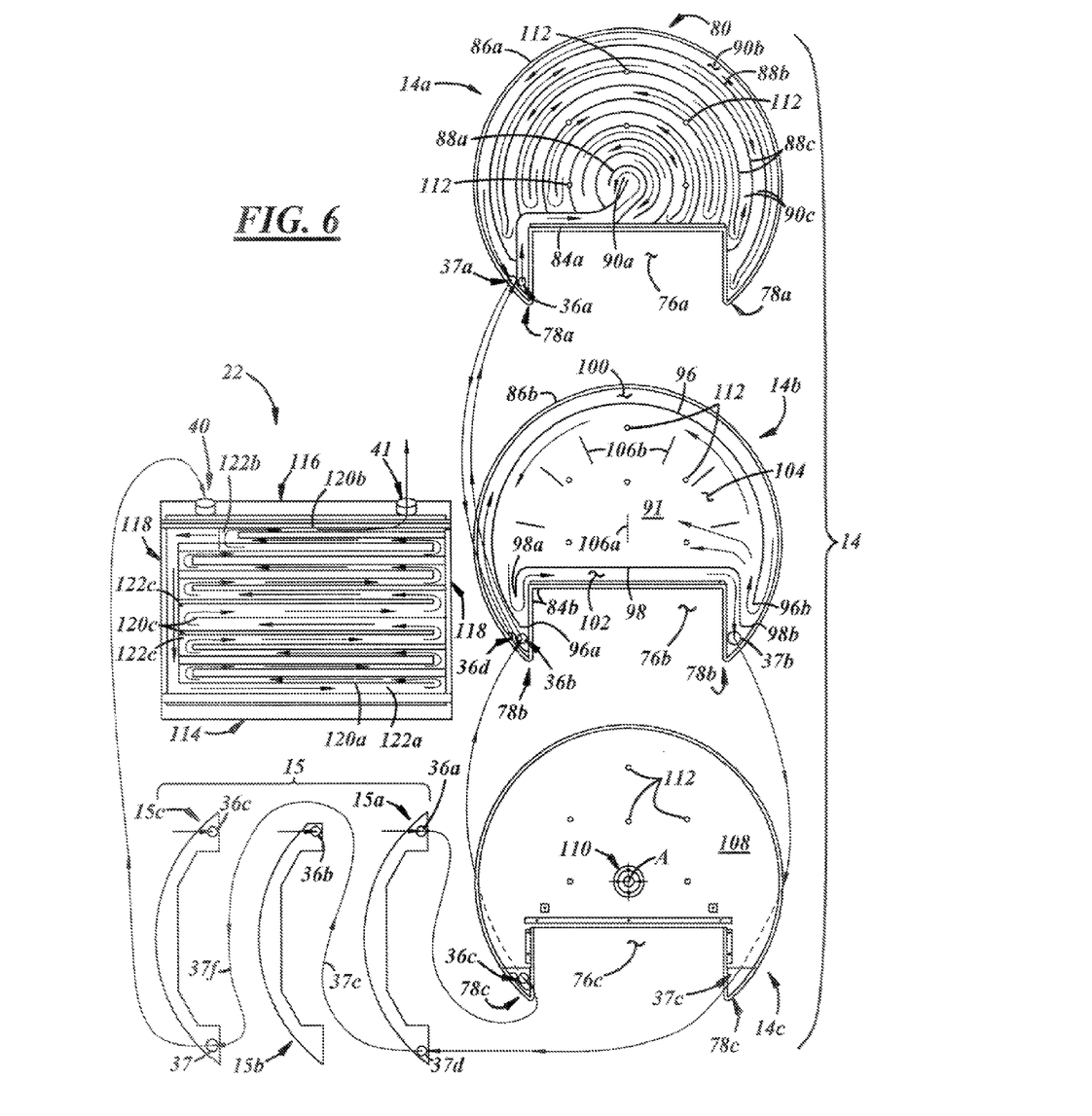
FIG. 6 is an exploded top view of oscillating and pusher portions of the batch charger of FIG. 1.

According to another embodiment, one portion of the base box 12 may be composed of a first material, and another portion may be composed of a second material different from the first material. For example, the lower level 12a may be composed of the first material, and the upper level 12b and/or the cover 12c may be composed of the second material. The first material may be relatively more resistant to high temperatures than the second material. For instance, the first material may include 310 stainless steel, and the second material may include 304 stainless steel. Referring now to FIGS. 6 and 8, the oscillating box 14 may be substantially circular in shape. As used herein, the phrase "substantially circular" includes a shape that is not exactly or entirely circular throughout, but has a recognizable circular profile. The oscillating box 14 may be disposed within the opening of the base box 12, and may include a rectangular pusher opening 76 at a front end between opposed point portions 78 and a midsection 80 between the point portions 78. The box 14 also may include a base 82 (FIG. 8), a front wall 84a, and a rear wall 86a. The rear wall 86a may be at least part-circular to accommodate rotation or oscillation within the base box (not shown).

The oscillating box 14 also may include a coolant labyrinth extending from the base 82 between the walls 84a, 86a and including a plurality of baffle walls 88a-c that establish a plurality of coolant channels 90a-c. The baffle walls 88a-c and the coolant channels 90a-c may be curvate. The baffle walls 88a-c may be shaped to follow the contour of the rear wall 86a. For example, the coolant channels 90a-c may be arcuate or curvate around the axis A. Accordingly, the baffle walls 88a-c and coolant channels 90a-c may be substantially circular. The baffle walls 88a-c and coolant channels 90a-c may include a radially inner-most baffle wall 88a and coolant channel 90a, a radially outer-most baffle wall 88b and coolant channel 90b, and one or more intermediate baffle walls 88c and coolant channels 90c therebetween.

Accordingly, the oscillating box 14 may include at least two concentric coolant channels. Additionally, the coolant channels may extend across the midsection 80. Further, the coolant channels may extend from point portion 78a to point portion 78a. Also, the coolant labyrinth may include an inlet 36a and an outlet 37a, wherein the inlet 36a may be upstream of the radially inner-most coolant channel 90a, and the outlet 37a may be downstream of the radially outer-most coolant channel 90b. Also, the inlet 36a may be provided in one point portion 78a and the outlet 37a may be provided the other point portion 78a.

In an embodiment where the oscillating box 14 includes the upper level 14b, the upper level 14b may include an intermediate plate 91, a front wall 84b, a rear wall 86b, an inlet baffle wall 96 extending from the intermediate plate 91 between the walls 84a, 86b adjacent to the rear wall 86b, and an outlet baffle wall 98 extending from the intermediate plate 91 between the walls 84b, 86b adjacent to the front wall 84b. The front and rear walls 84b, 86b may correspond to the front and rear walls 84a, 86a of the lower level 14a. The walls 84a-b, and 86a-b may be separate walls or may be integrated respectively with one another as illustrated in FIG. 8. The baffle walls 96, 98 may be shaped to follow the contour of their corresponding walls 86b, 84b to establish inlet and outlet coolant passages 100, 102. The inlet baffle wall 96 may include a fixed or closed end 96a in one point portion 78b, and a free or open end 96b in another point portion 78b. Likewise, the outlet baffle wall 98 may include a closed end 98a in one of the point portions 78b, and an open end 98b in the other point portion 78b.

The upper level 14b also may include a coolant pool 104 disposed between the walls 84b, 86b and, more particularly, between the baffle walls 96, 98. Accordingly, the baffle walls 96, 98, coolant channels 100, 102, and pool 104 may be substantially circular. Also, the upper level 14b may include a passage 36b, an inlet 36d, and an outlet 37b, wherein the inlet 36d maybe adjacent the closed end 96a of the inlet baffle wall 96 in the inlet coolant channel 100, and the outlet 37b may be in the outlet coolant channel 102 at the closed end 98b of the outlet baffle 98.

Further, the upper level 14b may include a plurality of baffle segments 106a-b disposed in the coolant pool 104. For example, the baffle segments may include two or more radially oriented baffle segments 106b disposed radially outward of the axis A, and at least one radially oriented baffle segment 106a disposed on the axis A.

The cover 14c may include a cover plate 108, and walls corresponding to the walls of the upper level 14b. Also, the cover 14c may include an inlet 36c that may be aligned with the passage 36b of the upper level 14b, and an outlet 37c that may be aligned with the outlet 37b of the upper level 14b. The cover 14c further may include a drive hub 110 that may be coupled in any suitable manner to the plate 108 and to the apparatus 24 for rotation of the oscillating box 14.

The oscillating box 14 also may include supports 112 extending between the base 82 and the cover plate 108. For example, the supports 112 may include shafts, pins, fasteners, or the like that may be welded, staked, pressed, fastened, or the like to corresponding portions of the base 82 and cover plate 108. The bezel 15 may be coupled to points 78c of the cover 14c across the pusher opening 76c in any suitable manner, and may include the oscillator inlet 36 which may include passages 36a-c through the levels 15a-c. The bezel 15 also may include a bezel cooling inlet 37d, a first coolant channel 37e between the lower and upper levels 15a, 15b, a second coolant channel 37f between the upper level 15b and the cover 15c, and the oscillator outlet 37.

According to another embodiment, one portion of the oscillating box 14 may be composed of a first material, and another portion may be composed of a second material different from the first material. For example, the lower level 14a may be composed of the first material, and the upper level 14b and/or the cover 14c may be composed of the second material. The first material may be relatively more resistant to high temperatures than the second material. For instance, the first material may include 310 stainless steel, and the second material may include 304 stainless steel.

Still referring to FIGS. 6 and 8, the pusher box 22 may include a front wall 114, a rear wall 116, side walls 118 extending between the front and rear walls 114, 116, and radially inner and outer walls 115, 117. The pusher box 22 also may include a coolant labyrinth including a plurality of baffle walls 120a-c that establish a plurality of coolant channels 122a-c. The baffle walls 120a-c may be shaped to follow the contours of the front, rear, and side walls 114, 116, 118. The pusher box 22 may be of hollow construction and curvate or arcuate around a pusher box axis P. Accordingly, the baffle walls 120a-c and coolant channels 122a-c may be substantially orthogonal extending back and forth through the pusher box in directions parallel to the pusher box axis. The pusher box 22 may include a front baffle wall 120a adjacent to the front wall 114 and establishing a front coolant channel 122a between the front baffle wall 120a and the front wall 114, a rear baffle wall 120b adjacent the rear wall 116 and establishing a rear coolant channel 122b between the rear baffle wall 120b and the rear wall 116, and one or more intermediate baffle walls 120c between the front and rear baffle walls 120a-b to establish one or more coolant channels 122c. The rear wall 116 may include the pusher inlet 40, and the pusher outlet 41.

According to another embodiment, one portion of the pusher box 22 may be composed of a first material, and another portion may be composed of a second material different from the first material. a front wall 114, a rear wall 116, side walls 118 extending between the front and rear walls 114, 116, For example, the front and side walls 114, 118 may be composed of the first material, and the rear wall 116 may be composed of the second material. The first material may be relatively more resistant to high temperatures than the second material. For instance, the first material may include 310 stainless steel, and the second material may include 304 stainless steel.

Figure 7:
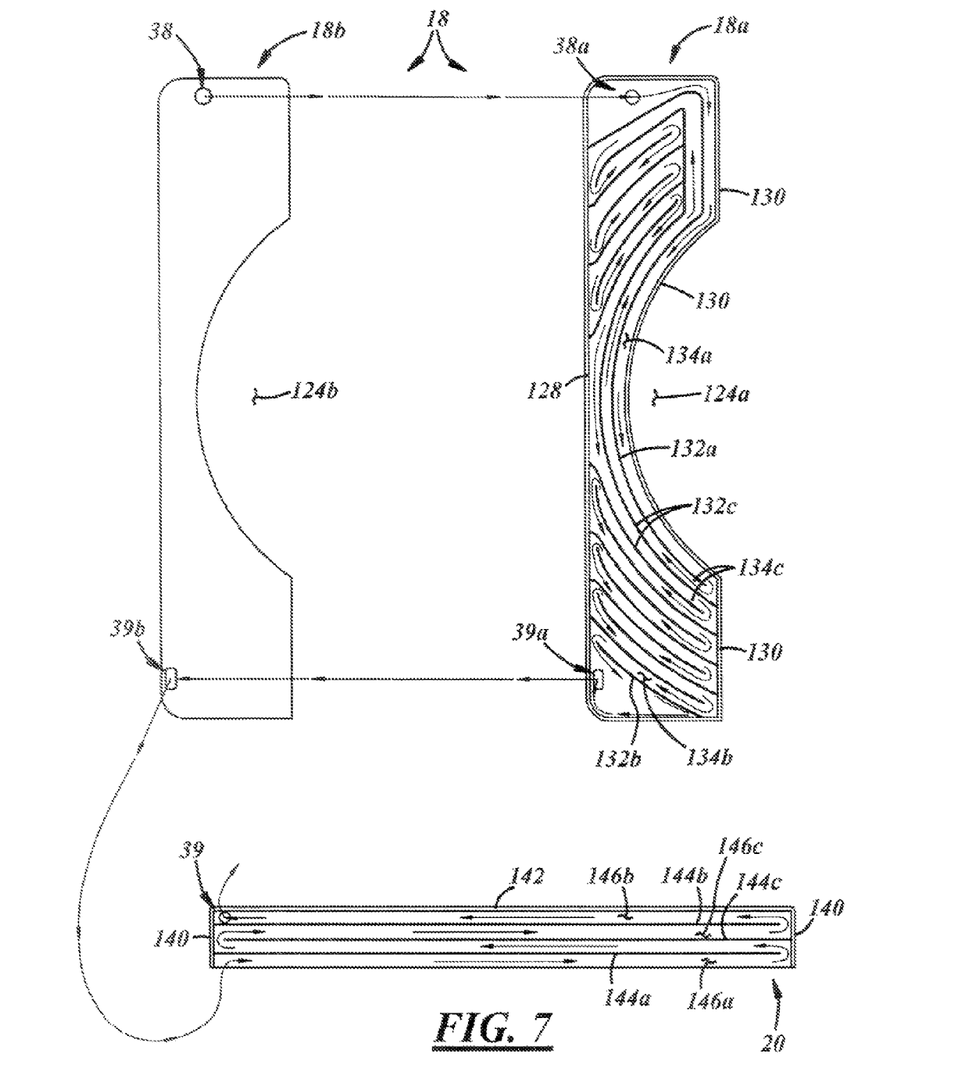
FIG. 7 is an exploded view of a riser portion of the batch charger of FIG. 1.

Now referring to FIGS. 7 and 8, the horizontal riser box 18 may be substantially rectangular. As used herein, the phrase "substantially rectangular" includes a shape that is not exactly or entirely rectangular throughout, but has a recognizable rectangular profile. The horizontal riser box 18 may include an oscillator opening 124a-b at a rear end to accommodate rotation of the oscillator 14, a base 126 (FIG. 8), a front wall 128, a rear wall 130, and a coolant labyrinth extending from the base 126 between the walls 128, 130. The horizontal riser box 18 may be mounted adjacent to the stationary box 12 and the opening 124a-b may close the part-circular opening 51 in the stationary box 12 to form a circular opening in which the oscillating box 14 is disposed.

The coolant labyrinth includes a plurality of curvate baffle walls 132a-c that establish a plurality of curvate coolant channels 134a-c. The baffle walls 132a-c may be shaped to follow the contour of the rear wall 130. The baffle walls 132a-c and coolant channels 134a-c may be incurvate, for example, about the oscillation axis A of the oscillating box 14 (FIG. 8). In a more specific example, the baffle walls 132a-c and coolant channels 134a-c may be substantially circular and may be concentric, for example, about the axis A (FIG. 8). The baffle walls 132a-c and coolant channels 134a-c may include a radially inner-most baffle wall 132a and coolant channel 134a, a radially outer-most baffle wall 132b and coolant channel 134b, and one or more intermediate baffle walls 132c and coolant channels 134c therebetween. Accordingly, the horizontal riser box 18 may include at least two concentric coolant channels 134a-c. Also, the coolant labyrinth may include an inlet 38a and an outlet 39a, wherein the inlet 38a may be upstream of the radially inner-most coolant channel 134a, and the outlet 39a may be downstream of the radially outer-most coolant channel 134b. The cover 18b may include the riser inlet 38 at one side and may be aligned with the inlet 38a of the lower level 18a, and an outlet 39b at the other side and in fluid communication with the outlet 39a of the lower level 18a and with the vertical riser 20.

According to another embodiment, one portion of the horizontal riser box 18 may be composed of a first material, and another portion may be composed of a second material different from the first material. For example, the lower level 18a may be composed of the first material, and the cover 18b may be composed of the second material. The first material may be relatively more resistant to high temperatures than the second material. For instance, the first material may include 310 stainless steel, and the second material may include 304 stainless steel.

The vertical riser 20 may include a front wall 136 (FIG. 8), a rear wall 138, side walls 140, and a top wall 142. As used herein, directional words such as top, bottom, upper, lower, radial, circumferential, lateral, longitudinal, transverse, vertical, horizontal, and the like are employed by way of description and not limitation. The vertical riser 20 also may include a coolant labyrinth including a plurality of baffle walls 144a-c and coolant channels 146a-c. More specifically, the coolant labyrinth may include a lower baffle wall 144a to establish an inlet coolant channel 146a between the lower baffle wall 144a and the horizontal riser 18, an upper baffle wall 144b to establish an outlet coolant channel 146b between the upper baffle wall 144b and the top wall 142, and one or more intermediate baffle walls 144c to establish one or more intermediate coolant channels 146c. The riser 20 also may include the riser outlet 39.

In one or more of the coolant boxes described above, the cross-sectional areas of the coolant channels may be smaller than those of conventional batch charger coolant boxes, for example, to provide relatively higher fluid velocity therethrough. This may be accomplished by providing a higher quantity of baffle walls per area in the present coolant boxes than are found in conventional batch charger coolant boxes. Also, in one or more of the coolant boxes described above, the cross-sectional areas of the coolant channels of a given box may be the same as one another, or they may be different from one another. In one embodiment, the cross-sectional area of the radially inner-most coolant channels may be smaller than one or more of the outer-most or intermediate coolant channels, for example, to provide relatively higher fluid velocity through the radially inner-most coolant channel. It is believed that the higher fluid velocities will minimize onset of nucleate boiling of coolant at hot spots close to the glass melt in the furnace, like the radially inner coolant channels and the like. It is believed that reduction of such nucleate boiling may reduce corrosion of the coolant boxes. Those of ordinary skill in the art will recognize that the relative sizes of the coolant channels will be specific to a particular batch charger design and application.

Figure 9:
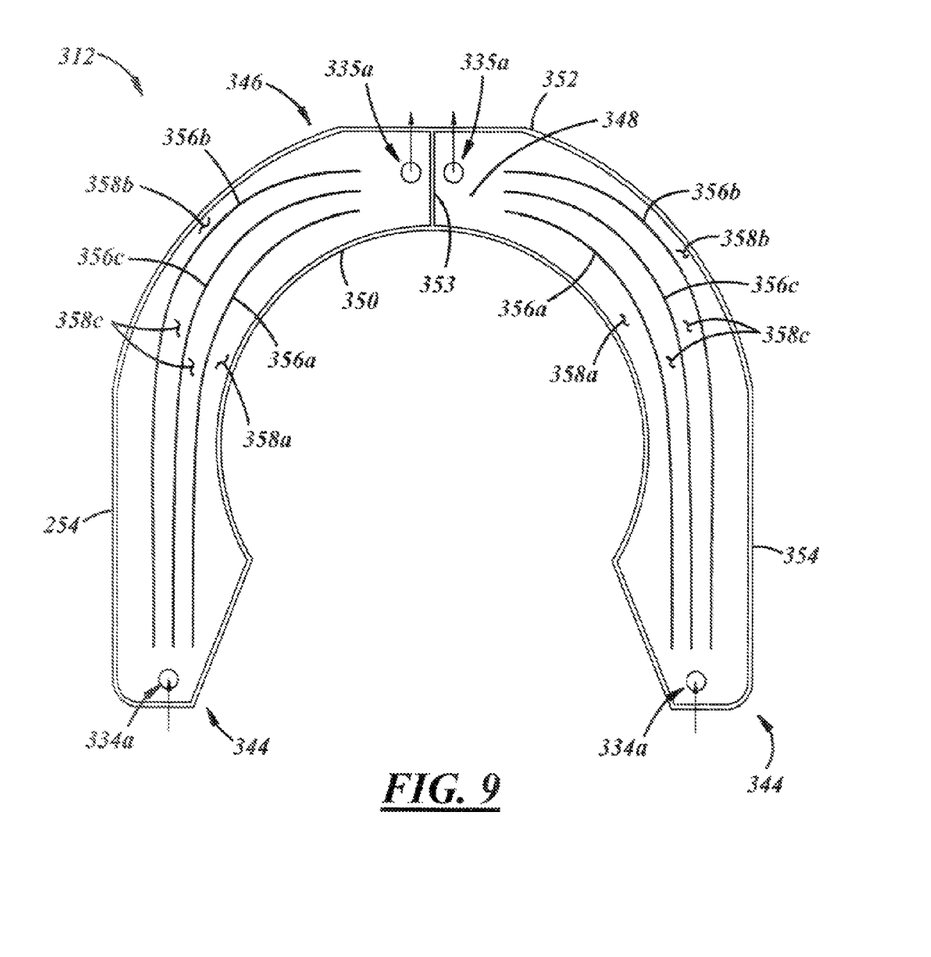
FIG. 9 is another base portion of a batch charger in accordance with another illustrative embodiment of the present disclosure.

FIG. 9 illustrates another illustrative embodiment of a base box 312. This embodiment is similar in many respects to the embodiment of FIGS. 4 and 5 and like numerals between the embodiments generally designate like or corresponding elements throughout the several views of the drawing figures. Accordingly, the descriptions of the embodiments are incorporated into one another. Additionally, the description of the common subject matter generally may not be repeated here.

The base box 312 may include heel portions 344 and a toe portion 346 between the heel portions 344. The base box 312 also may include a base 348, a front wall 350, a rear wall 352, and side walls 354 between the front and rear walls 350, 352. The base box 312 also may include at least one divider 353 to divide the box 312 into at least two separate chambers, each including a coolant labyrinth extending from the base 348 between the walls 350, 352, 354.

The coolant labyrinths each include a plurality of curvate baffle walls 356a-c that establish a plurality of curvate coolant channels 358a-c. The baffle walls 356a-c and coolant channels 358a-c may be incurvate, for example, about the oscillation axis A of the oscillating box 14 (FIG. 8). In a more specific example, the baffle walls 356a-c and coolant channels 358a-c may be concentric, for example, about the axis A (FIG. 8). In any case, the baffle walls 356a-c and coolant channels 358a-c may be substantially curvate at least along a portion of their lengths. The baffle walls 356a-c and coolant channels 358a-c may include a radially inner-most baffle wall 356a and coolant channel 358a, a radially outer-most baffle wall 356b and coolant channel 358b, and one or more intermediate baffle walls 356c and coolant channels 358c therebetween. Accordingly, each chamber of the base box 12 may include three or more coolant channels 358a-c that may extend from heel portion 344a to heel portion 344a across the toe portion 346. The baffle walls 356a-c and coolant channels 358a-c may be concentric, for example, at least over their curvate portions. Also, each chamber of the coolant labyrinth may include an inlet 334a and an outlet 335a, wherein the inlet 334a may be upstream of the radially inner-most coolant channel 358a, and the outlet 335a may be downstream of the radially outer-most coolant channel 358b.

There thus has been disclosed a coolant box for a glass batch charger, that fully satisfies all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A glass batch charger for charging batch glass-forming materials into a melt furnace, which includes:
   a stationary box of hollow arcuate construction having a part-circular opening and coolant circulation paths extending throughout the hollow arcuate construction,
   an oscillating box of hollow part-circular construction disposed within and rotatably supported about an oscillation axis within the part-circular opening of the stationary box, the oscillating box having coolant circulation paths extending throughout the hollow part-circular construction, and
   means for circulating coolant at least through the stationary and oscillating boxes,
   characterized in that the coolant circulation paths in the stationary box are arcuate throughout substantially their entire length and concentrically incurvate about the oscillation axis of the the part-circular opening, and the coolant circulation paths in the oscillating box are arcuate and concentrically disposed about the oscillation axis and shaped to follow the contour of a rear wall of the oscillating box.

2. The glass batch charger set forth in claim 1 further comprising a pusher box on the oscillating box for coupling to an actuator to push glass batch materials from a hopper past the stationary and oscillating boxes into a melt furnace, wherein the pusher box is hollow and arcuate around a pusher box axis, the hollow pusher box containing coolant circulation paths extending back and forth through the pusher box in directions parallel to the pusher box axis.

3. The glass batch charger set forth in claim 1 including a horizontal riser box mounted adjacent to the stationary box and having an arcuate opening that closes the part-circular opening in the stationary box to form a circular opening in which the oscillating box is disposed, the horizontal box having coolant circulation paths that are arcuate around the arcuate opening.

* * * * *